Figure 1:
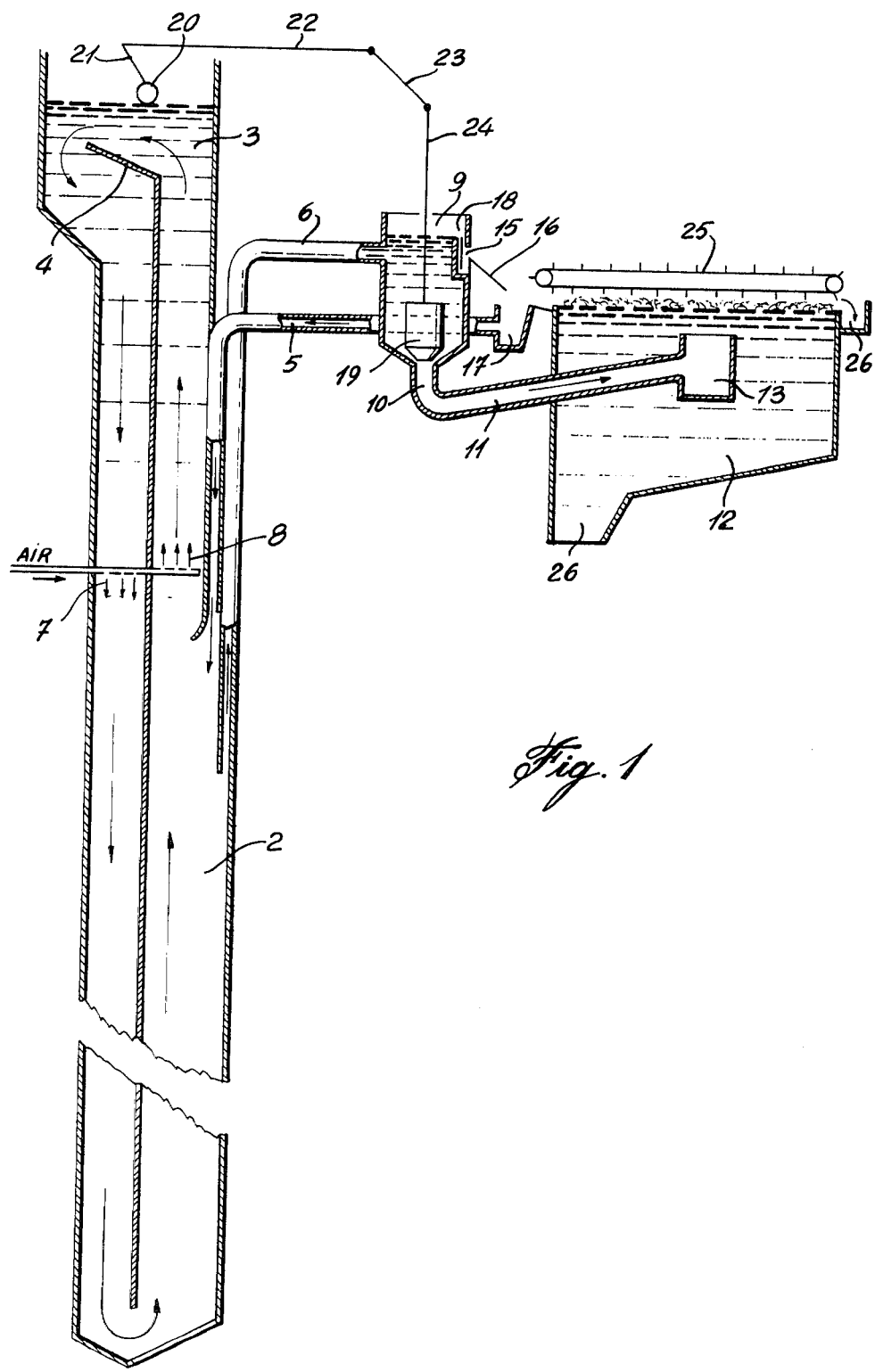

United States Patent [19]

Pollock

[11] 4,287,070

[45] Sep. 1, 1981

[54] METHOD MAINTAINING A CONSTANT GAS TO SOLIDS RATIO IN EFFLUENT FROM A LONG VERTICAL SHAFT BIOREACTOR

[75] Inventor: David C. I. Pollock, Richmond Hill, Canada

[73] Assignee: C-I-L Inc., Montreal, Canada

[21] Appl. No.: 159,352

[22] Filed: Jun. 13, 1980

[30] Foreign Application Priority Data

Oct. 26, 1979 [CA] Canada ................................. 338537

[51] Int. Cl.³ .............................................. C02F 3/12
[52] U.S. Cl. .................................. 210/626; 210/629; 210/744; 210/109; 210/195.3; 210/220
[58] Field of Search ............... 210/608, 621, 622, 623, 210/626, 627, 629, 741, 744, 97, 104, 109, 123, 138, 129, 130, 132, 195.1, 195.3, 220, 221.2; 137/571, 593

[56] References Cited

U.S. PATENT DOCUMENTS

| | | | |
|---|---|---|---|
| 2,746,605 | 5/1956 | Baum | 210/221.2 |
| 3,617,539 | 11/1971 | Grutsch | 210/608 |
| 3,864,247 | 2/1975 | Fuchs | 210/608 |
| 3,892,659 | 7/1975 | Kirk | 210/621 |
| 3,966,598 | 6/1976 | Ettelt | 210/221.2 |
| 4,071,443 | 1/1978 | Gorski | 210/627 |

OTHER PUBLICATIONS

Proceedings of the 31st Industrial Waste Conference, May 4, 5, 6, 1976, Purdue University, Ann Arbor Science, U.S.A., p. 344–351.

Primary Examiner—Ernest G. Therkorn
Attorney, Agent, or Firm—Donald G. Ballantyne

[57] ABSTRACT

An improved method and apparatus is provided for maintaining a constant gas-to-solids ratio in the effluent from a long vertical shaft waste treatment bioreactor. In a vertical bioreactor wherein waste is circulated under air-injected oxidation conditions around a loop comprising adjacent downcomer and riser chambers connected at their terminals and operatively connected to a separation apparatus, the improvement comprises withdrawing treated effluent from the riser chamber into a cylindrical vessel from whence the effluent is directed either to the separation chamber or into the influent stream depending on the total level of fluid in the bioreactor. Removal of large air bubbles from the effluent is also effected in the cylindrical vessel. The method provides improved gas-to-solids ratio in the effluent and improves sludge flotation in the separation apparatus.

4 Claims, 2 Drawing Figures

METHOD MAINTAINING A CONSTANT GAS TO SOLIDS RATIO IN EFFLUENT FROM A LONG VERTICAL SHAFT BIOREACTOR

This invention relates to a method for controlling the flow of influent and effluent streams in a long vertical shaft bioreactor with a consequent maintenance of a constant gas-to-solids ratio in the effluent.

Long or deep shaft bioreactors suitable for the treatment of liquid sewage or industrial waste by a modified activated sludge process are known having been disclosed, for example, in Canadian Pat. No. 1,033,081 to Bailey et al. Such bioreactors comprise a circulatory system including at least two substantially vertical long chambers communicating with each other at their upper and lower ends, the upper ends being connected to a basin. Mixed liquor, comprising wastewater, activated sludge and nutrients is caused to descend one chamber, the downcomer, and ascend another chamber, the riser. The activated sludge consists essentially of microorganisms capable of the aerobic biological degradation of waste and is known alternatively as the biomass. Oxygen in the form of air is injected into the mixed liquor as it passes through the downcomer chamber. An aerobic biological reaction wherein the organic matter is oxidized by microorganisms takes place as the mixed liquor circulates through the bioreactor. The products of the reaction are carbon dioxide, additional microorganisms (biomass) which in admixture with inert material in the waste, form a sludge.

In a modified design of a long vertical shaft bioreactor, the influent wastewater is injected into the riser chamber at depth through an influent duct and the effluent is taken off through a duct having its intake located in the riser chamber below the opening of the influent duct. An oxygen containing gas is injected into the riser chamber in the vicinity of the influent duct entry but above the intake of the effluent duct. The advantage of this procedure is that the effluent is substantially free of gross bubbles with the resultant effect that when the effluent passes to, for example, a flotation tank for separation of sludge, any gross bubbles, which hinder effective flotation, are substantially absent.

To maintain adequate operation of a long vertical shaft bioreactor, the flow out of the bioreactor must substantially equal the flow into the bioreactor. Thus when the inflow stream is reduced in volume because of up-stream interruptions, the velocities of flow in the influent and effluent chambers and ducts will be correspondingly reduced. However, it is advantageous to maintain the flow velocities in the influent and effluent chambers as nearly constant as possible for two important reasons. When the flow in the influent chamber is small, voidage or the fraction of gas in the fluid in the riser chamber will increase since the flow of oxygen-containing gas injected into the waste in the riser is constant. Likewise, a low velocity of flow in the effluent duct leading to the separation state gives longer transfer times of effluent from the bioreactor riser chamber to the flotation separation tank, permitting a larger amount of dissolved gas to escape to produce large bubbles before reaching the separation stage. This bubble content as noted heretofore, reduces the effectiveness of flotation.

A method has now been discovered whereby the influent and effluent flows in a bioreactor may be maintained substantially constant with the result that the gas-to-solids ratio in the effluent stream is maintained constant.

In the method of this invention the effluent stream from the bioreactor is discharged tangentaily into a cylindrical vessel, which vessel has controllable variable discharge openings in its base and in its side wall. The opening in the base discharges into a means for separating solids from the effluent, for example, a flotation tank, and the opening in the side wall discharges into the influent duct of the bioreactor for recirculation of the discharged material through said bioreactor.

The above-described cylindrical vessel, preferably having a cone-shaped base, is located at sufficient height above the means for separating solids from the effluent that gravity flow to the separating means from the cylindrical vessel can occur. The means for separating solids from the effluent as noted heretofore typically will be a flotation tank or a sedimentation vessel.

The control of the discharge openings in the above-described cylindrical vessel is preferably based upon the level of the liquid in the bioreactor basin which connects the upper ends of the downcomer and riser chambers. For example, a float resting on the surface of the liquid effluent in the basin may be linked mechanically to a valve which controls the rate of discharge through the opening in the base of the cylindrical vessel so that as the level of fluid in the basin rises, the rate of flow through the base opening can be automatically increased. Conversely, when the level of fluid in the basin lowers, the rate of flow through the base opening of the cylindrical vessel is restricted causing the level of fluid in the cylindrical vessel to rise. Such a rise in level will cause discharge of effluent through a side wall opening of the cylindrical vessel and thence into the influent duct of the bioreactor, thus returning the discharged effluent to the bioreactor.

Alternatively, a float resting on the surface of the fluid effluent in the bioreactor basin can be linked mechanically to a valve controlling discharge through the opening in the side wall of the cylindrical vessel so that when the level of effluent in the basin rises, discharge through the side wall opening of the cylindrical vessel is restricted causing increased flow of fluid through the base discharge opening. Conversely, a fall in level of the fluid effluent in the bioreactor basin will cause increased flow through the side wall discharge opening, thus diverting a portion of the fluid effluent back into the influent duct of the bioreactor and reducing flow of fluid through the base discharge opening.

A convenient means for controlling the discharge through the base opening of the above-described cylindrical vessel is a plug valve. Likewise, the means for controlling the discharge through the side wall can be a variable weir or a gate valve.

When the base opening of the above-described cylindrical vessel discharges into a flotation tank, it is of advantage to dispense with any controlable valve at the base opening and to rely solely on the use of a valve or weir on the side wall discharge opening to control discharge. With no moving valve in the effluent line the effluent stream is kept free from shear and surges caused by valve action and there is less tendency for dissolved gas to come out of the waste effluent solution. In addition, the absence of a valve in the effluent line provides a smoother flow to the flotation tank or other separating means. Control of discharge of fluid from the above-described cylindrical vessel need not be limited to mechanical means actuated by a float on the surface of fluid in the bioreactor basin. For example, a sonic level detector can be employed to monitor the level of the fluid in the bioreactor basin and in response to changes in fluid, actuate a servovalve controlling discharge from the vessel.

The invention is illustrated by the accompanying drawings wherein

Figure 2:
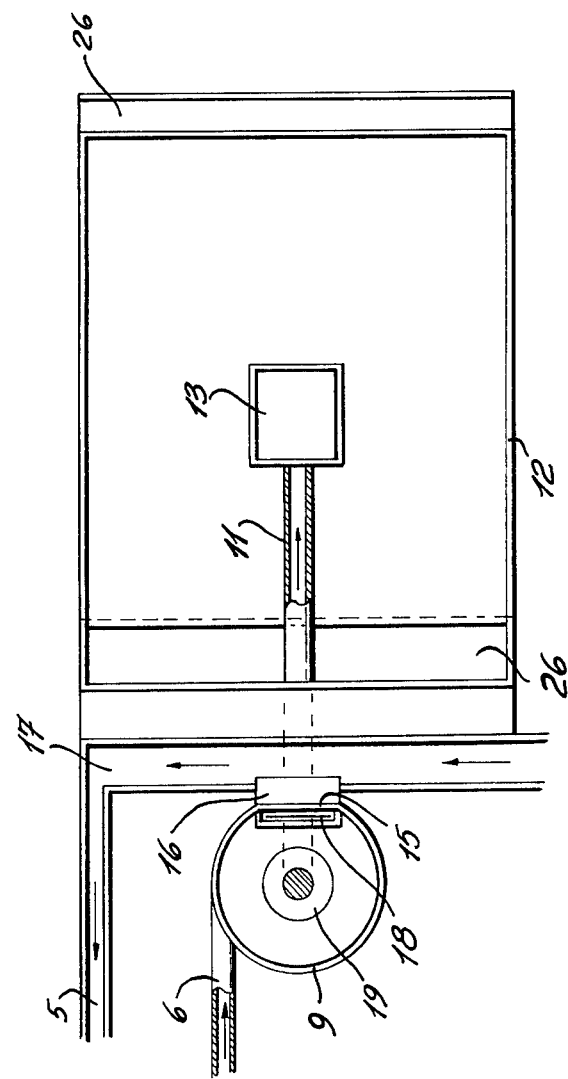

FIG. 1 is a diagrammatic elevational view of an apparatus for carrying out the method of the invention positioned to control flows between a bioreactor and a flotation tank, and FIG. 2 is a plan view of the apparatus and connected flotation tank.

Referring to FIGS. 1 and 2, a bioreactor downcomer chamber is shown at 1 and a riser chamber communicating therewith at 2. Connecting the downcomer and riser at their upper ends is basin 3 which is fitted with a baffle 4 that directs the flow of fluid waste from the riser across the basin and into the downcomer. Influent waste fluid from, for example, a municipal sewage collection system, enters the bioreactor riser through trough 17 and influent duct 5 and effluent is taken off from the riser through effluent duct 6. An oxygen-containing gas, usually air, is injected into the downcomer through sparger 7 and optionally also into the riser through sparger 8. Sparger 8 is located in the vicinity of the outlet of influent duct 5 but above it, and thus downstream from the intake of effluent duct 6.

Biologically reacted effluent from duct 6 is directed tangentially into cylindrical vessel or swirl tank 9 which is fitted with two discharge openings. In the base of swirl tank 9, opening 10 forms the inlet to duct 11 discharging into flotation tank 12 through a feed pot 13. Swirl tank 9 has a second discharge opening 15 located on its upper side through which effluent discharges by passing over shute 16 and falling into trough 17. Trough 17 carries influent waste fluid to influent duct 5 and chamber 2. Thus discharge from swirl tank 9, passing through side discharge opening 15 enters the bioreactor influent duct 5 and is recycled through the bioreactor. The flow through opening 15 can be varied by means of an adjustable weir 18.

Discharge through base opening 10 of swirl tank 9 may be controlled by plug valve 19. Plug valve 19 is actuated in response to changes in level of the fluid in basin 3 as monitored by float 20. Float 20 is attached to arm 21 carried by, for example, a rotatable shaft 22. To the external projection of shaft 22 is fixed bell crank 23 and rod 24 which in turn is attached to plug valve 19. When the level of liquid waste in basin 3 rises, float 21 will rise causing plug valve 19 to rise allowing an increased flow of effluent through opening 10 to flotation tank 12. Similarly a drop in level of the fluid in basin 3 causes plug valve 19 to lower restricting the size of opening 10. Alternatively a control float may be placed in trough 17 for more rapid registration and control of the liquid levels.

Sludge comprising mainly biomass with minor amounts of unreacted waste separates by flotation in flotation tank 12 and is carried by scraper 25 to trough 17 for return to the bioreactor. Sludge that separates in tank 12 by sedimentation collects in trough 26 from which it may be transferred to influent trough 17 by a pump system, not shown, or may be collected for disposal. Decanted treated liquid passes into trough 26 for discharge.

When a cylindrical vessel or swirl tank 9 having its discharge to a flotation tank controlled by a valve in its base opening is employed as before described, the following control conditions are found.

At conditions of zero influent flow of waste liquor into the bioreactor, the fluid level in the bioreactor basin 3 falls. The valve 19 in the base opening 10 of the swirl tank 9 is caused to close in response to the fall in level of the basin, cutting off flow of effluent to the flotation tank 12. As the effluent collects and rises in the swirl tank 9 this effluent overflows through its side discharge opening 15 into the influent trough 17, returning the effluent to the bioreactor via conduit 5.

At conditions of maximum influent flow of waste liquor to the bioreactor, the fluid level in the bioreactor basin 3 rises. Thus the valve 19 in the base opening of the swirl tank 9 is caused to open in response to the rise in level in the basin permitting flow of effluent to the flotation tank 12 with no overflow through the side opening 15 into the influent trough 17. Thus influent flow to the bioreactor is equal to the effluent flow from the bioreactor to the flotation tank.

At conditions intermediate of zero and maximum influent flow to the bioreactor, a portion of the effluent will overflow into the influent trough 17 and a portion will flow to the flotation tank 12. Thus it is possible to control flows in the bioreactor so that influent and effluent flows are of constant velocities. As a result, it is possible to design the several chambers of a long vertical shaft bioreactor so as to provide for operation in a zone of optimum effluent gas lift and optimum dissolved gas concentration. It has been found that there is a narrow band of flow velocities where maximum dissolved and optimum bioreaction gas can be achieved. Since it is possible by the method of the invention to maintain constant the flow of influent to the bioreactor, to maintain the flow of effluent to the swirl tank 9 and to maintain the flow of effluent from the swirl tank 9 to the flotation tank 12, and since it is also possible to maintain a constant rate of injection of oxygen-containing gas into the bioreactor, it is thus possible to design a long vertical shaft bioreactor which will deliver effluent with a constant gas-to-solids ratio to a flotation tank. It has been found that the gas-to-solids ratio is a principal design parameter leading to good flotation.

Thus the apparatus and method of this invention provide an effective means for controlling the operation of a long vertical shaft bioreactor.

The apparatus of the invention also provides for the separating gross bubbles from the effluent prior to delivery of the effluent into the flotation tank. As the effluent ascends the effluent duct to regions of lower hydrostatic pressure, a certain amount of bubble formation is inevitable as gas comes out of solution in the effluent liquid. As the effluent circulates or swirls in the swirl tank, gross bubbles are largely separated and vented and only the small bubbles are carried in the effluent for discharge to the flotation tank. In the flotation tank, gross bubbles tend to cause disruption of the floating blanket of sludge. Since the effluent feed to the swirl tank can be maintained constant, the swirl tank can be designed to optimize gross bubble separation.

The following example describes the efficient operation of an activated sludge treatment method wherein the gas-to-solids ratio in the effluent stream is maintained substantially constant.

EXAMPLE

A long vertical shaft bioreactor of the type shown in FIG. 1 comprised a shaft having a 16 inch outer diameter and a depth of approximately 500 feet. The shaft contained a concentrically placed 10 inch diameter downcomer. Influent and effluent ducts were positioned between the downcomer and the surrounding shaft occupying almost half the annular space, the remaining space comprising the riser. With municipal sewage being circulated through the bioreactor at a flow velocity of 0.6 feet/second and air injected into the waste at a rate of 8 cubic feet/minute, a high dissolved gas value and a low dispersed gas value was measured. At waste flow velocities of 2 feet/second, the reverse condition of low dissolved gas and high dispersed gas values were measured. For an economic operation of the particular bioreactor in terms of throughput and power consumption it has been found that a flow velocity of 3 feet/second or greater was required which velocity, together with desirable high dissolved gas value was achieved using the method and apparatus of the invention. Using the cylindrical vessel and liquid level control mechanism of the invention as described, the bioreactor was operated for a period of 40 days at a flow velocity in excess of 3 feet/second. Samples of effluent taken twice daily (except weekends) at a position just before entry into the cylindrical vessel gave values of upwards of 60 ml/liter of dispersed gas and 20 ml/liter of dissolved gas. Samples taken of effluent at a position of exit from the cylindrical vessel gave values of 10 ml/liter of dispersed gas and the value of dissolved gas remained constant at about 20 ml/liter. Thus the waste passing through the cylindrical vessel was maintained at a substantially constant gas-to-solids ratio.

The embodiments of the invention in which an exclusive property or privilege is claimed are defined as follows:

1. In a modified activated sludge waste treatment method wherein an aerobic biological reaction takes place during the continuous circulation of aerated fluid waste in an apparatus including a basin, a long vertical downcomer chamber, a long vertical riser chamber operatively communicating with the downcomer through the basin and at the lower end of the downcomer and a sludge separation means operatively communicating with the riser, an improvement whereby the dispersed and dissolved gas content of the waste fluid can be maintained which comprises removing effluent waste from the said riser chamber and discharging the said effluent waste into a cylindrical vessel positioned between said riser chamber and said sludge separation means, and at a higher elevation than the said sludge separation means, discharging the said effluent waste from the said cylindrical vessel selectively in controlled volumes to said separation means or to return said effluent waste to said riser chamber in response to the level of waste liquor in the said basin the said basin waste level and consequent pressure exerted thereby upon the fluid in the said apparatus being a means to govern the gas content in the said waste.

2. A method as claimed in claim 1, wherein the effluent waste is discharged into the said cylindrical vessel tangentially thereto to remove large dispersed gas bubbles from the said discharged waste.

3. In a long vertical shaft apparatus adapted for the aerobic biological treatment of activated sludge waste and involving the continuous circulation therethrough of waste liquor, said apparatus comprising a basin, a long vertical downcomer chamber, a long vertical riser chamber operatively communicating with the downcomer through the basin and at the lower end of the downcomer to form a loop, the riser and the downcomer having means for the injection therein at depth of an oxygen-containing gas, and a sludge separation chamber operatively connected to the said riser, the improvement which comprises:

A cylindrical vessel adapted to receive a stream of treated effluent waste through an inlet port from said bioreactor riser chamber, the said cylindrical vessel having a side wall opening operatively communicating with the riser chamber and a base opening operatively communicating with the sludge separation chamber, and means by which the volume of effluent flow from the said cylindrical vessel to the said riser and separation chambers may be controlled in response to the level of liquid in the said basin.

4. An apparatus as claimed in claim 3 wherein the said inlet port in the said cylindrical vessel is directed tangentially to the side wall of said vessel.

* * * * *